United States Patent
Kim et al.

(10) Patent No.: US 10,502,460 B2
(45) Date of Patent: Dec. 10, 2019

(54) REFRIGERATOR

(71) Applicant: LG Electronics Inc., Seoul (KR)

(72) Inventors: Kyeongyun Kim, Seoul (KR); Kyungseok Kim, Seoul (KR); Kyunghun Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 15/545,559

(22) PCT Filed: Jan. 21, 2016

(86) PCT No.: PCT/KR2016/000636
§ 371 (c)(1),
(2) Date: Jul. 21, 2017

(87) PCT Pub. No.: WO2016/117934
PCT Pub. Date: Jul. 28, 2016

(65) Prior Publication Data
US 2018/0045433 A1 Feb. 15, 2018

(30) Foreign Application Priority Data
Jan. 23, 2015 (KR) .................. 10-2015-0011347

(51) Int. Cl.
*F25B 7/00* (2006.01)
*F25B 5/04* (2006.01)
*F25B 49/02* (2006.01)

(52) U.S. Cl.
CPC ............. *F25B 5/04* (2013.01); *F25B 7/00* (2013.01); *F25B 49/02* (2013.01); *F25B 49/022* (2013.01);
(Continued)

(58) Field of Classification Search
CPC ........... F25D 11/25; F25B 7/00; F25B 25/005
See application file for complete search history.

(56) References Cited

U.S. PATENT DOCUMENTS

| | | | | | |
|---|---|---|---|---|---|
| 3,918,267 | A | * | 11/1975 | Canter | F25C 1/12 |
| | | | | | 62/138 |
| 2008/0034768 | A1 | * | 2/2008 | Pimentel | F25D 17/065 |
| | | | | | 62/180 |
| 2009/0158768 | A1 | * | 6/2009 | Rafalovich | F25D 11/025 |
| | | | | | 62/434 |

FOREIGN PATENT DOCUMENTS

| | | |
|---|---|---|
| EP | 2420760 | 2/2012 |
| WO | 2014045612 | 3/2014 |

OTHER PUBLICATIONS

International Search Report and Written Opinion in International Application No. PCT/KR2016/000636, dated Apr. 1, 2016, 10 pages (with English translation).

* cited by examiner

*Primary Examiner* — David J Teitelbaum
(74) *Attorney, Agent, or Firm* — Fish & Richardson P.C.

(57) ABSTRACT

Disclosed is a refrigerator. The refrigerator includes a first compressor (100) configured to compress refrigerant, a first condenser (110) configured to condense the refrigerant compressed in the first compressor (100), a first expansion valve (120) configured to reduce a temperature and pressure of the refrigerant condensed in the first condenser (110), a first evaporator (140) configured to evaporate the refrigerant having passed through the first expansion valve (120), a second compressor (200) configured to compress refrigerant, a second condenser (210) configured to condense the refrigerant compressed in the second compressor (200), a second expansion valve (220) configured to reduce a temperature and pressure of the refrigerant condensed in the second condenser (210) and a second evaporator (230) configured to evaporate the refrigerant having passed through the second expansion valve (220). The refrigerator further includes a heat exchanger (130) located at a rear of (Continued)

the first expansion valve (120), and the heat exchanger (130) and the second condenser (210) undergo heat exchange therebetween.

14 Claims, 3 Drawing Sheets

(52) U.S. Cl.
CPC ....... *F25B 2600/112* (2013.01); *Y02B 30/743* (2013.01)

[Fig. 1]
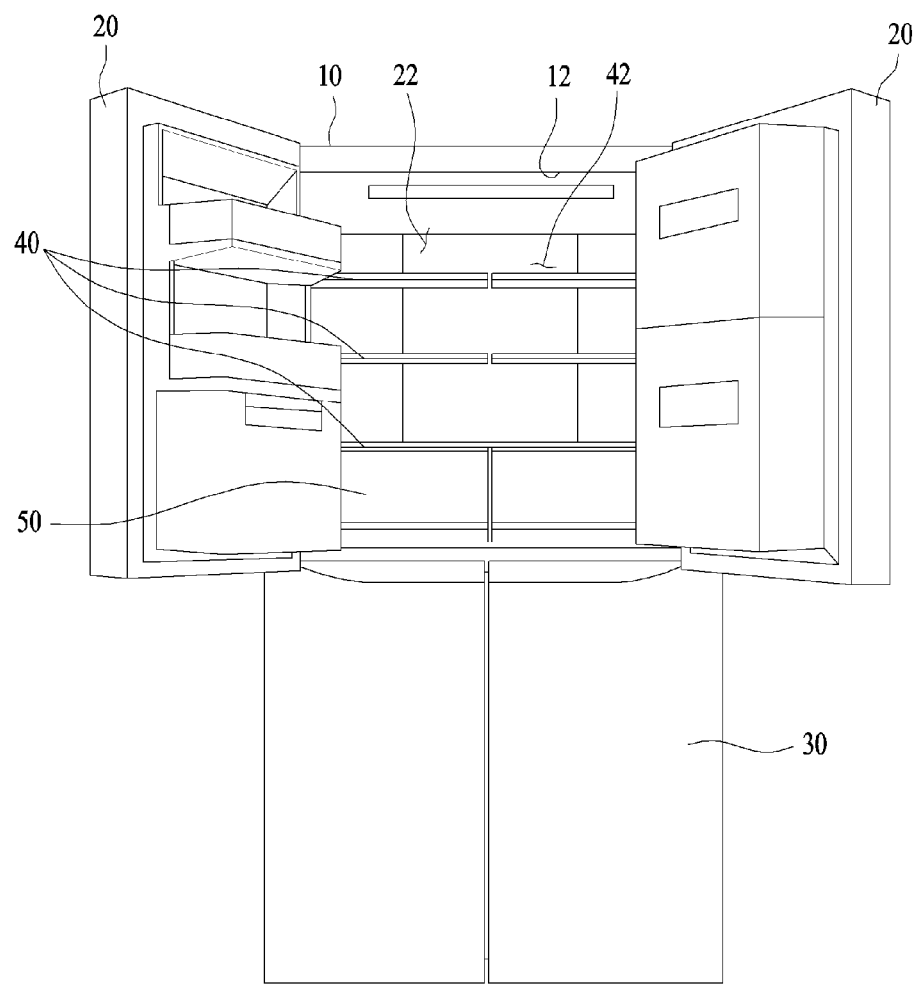

[Fig. 2]
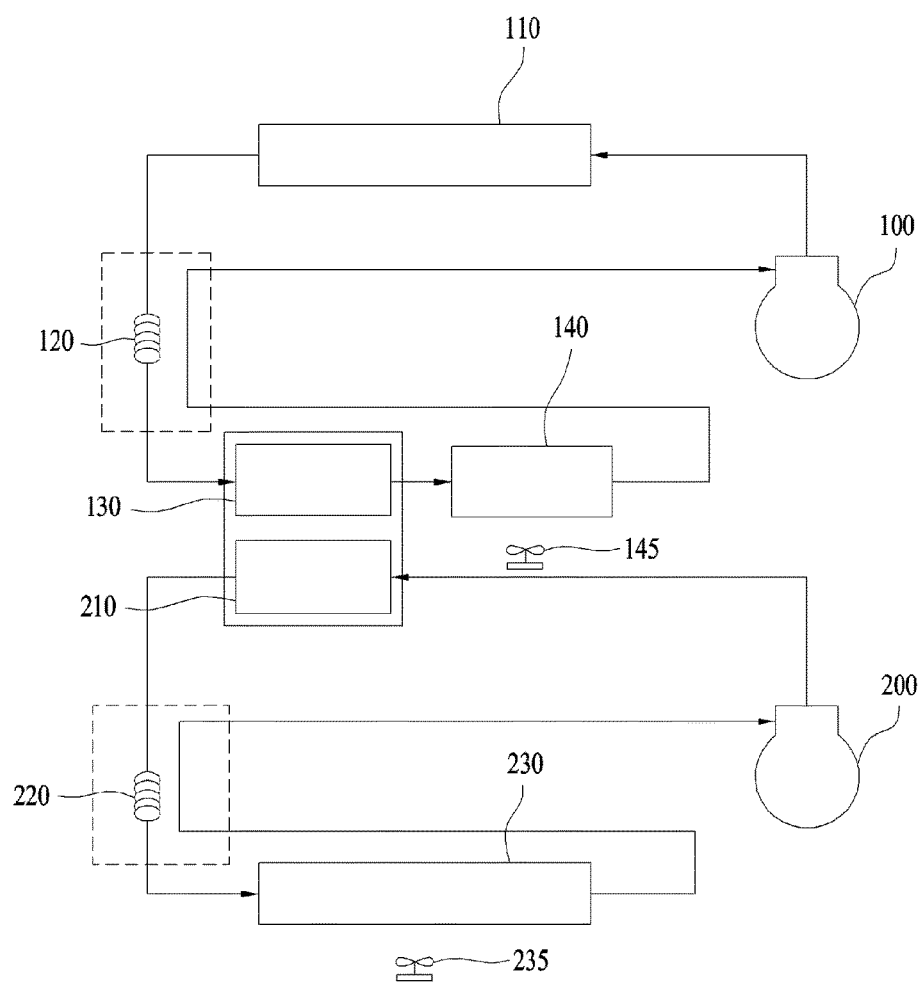

[Fig. 3]
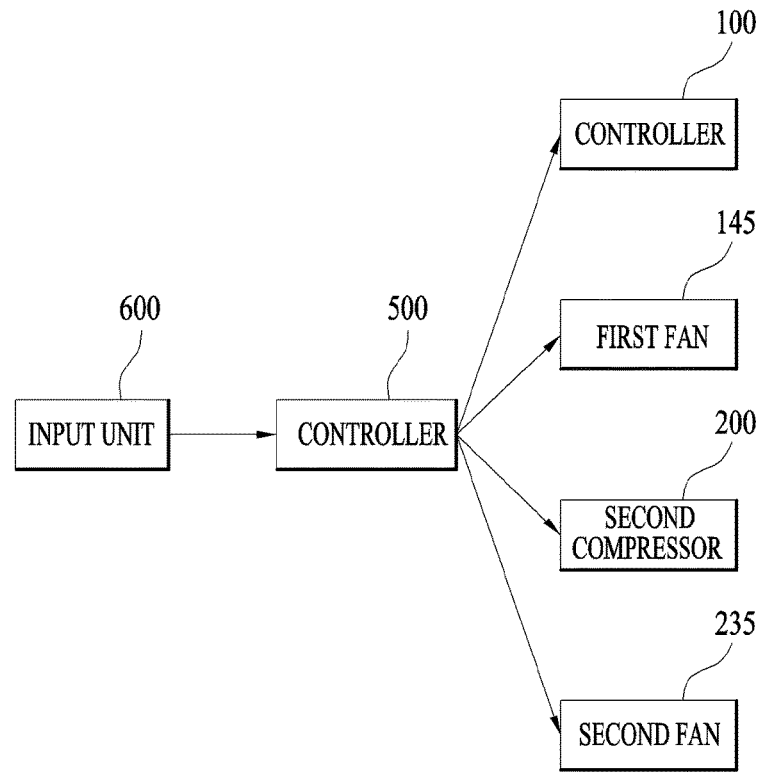
[Fig. 4]
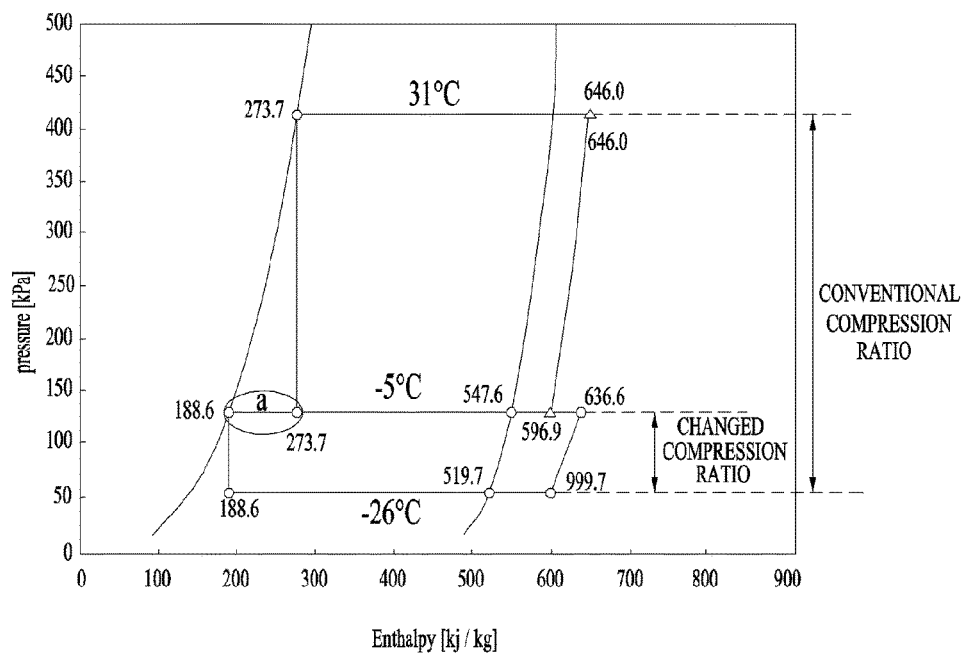

REFRIGERATOR

CROSS-REFERENCE TO RELATED APPLICATIONS

This application is a National Stage application under 35 U.S.C. § 371 of International Application No. PCT/KR2016/000636, filed Jan. 21, 2016, which claims priority under 35 U.S.C. 119(a) to Korean Patent Application No. 10-2015-0011347, filed Jan. 23, 2015. The disclosures of the prior applications are incorporated by reference in their entirety.

TECHNICAL FIELD

The present invention relates to a refrigerator and, more particularly, to a refrigerator having improved operation efficiency.

BACKGROUND ART

Generally, a refrigerator is used to keep, for example, food at freezing or less or at a temperature slightly above freezing. The refrigerator includes a case, which defines an accommodation space divided into a freezing compartment and a refrigerating compartment, and devices, which constitute a refrigeration cycle to lower temperatures inside the freezing compartment and the refrigerating compartment, such as, for example, a compressor, a condenser, an evaporator, and an expansion valve.

Doors are mounted to one side of the case and serve to open or close the freezing compartment and the refrigerating compartment respectively.

In the configuration of the refrigerator described above, the refrigeration cycle cools air in such a manner that low-temperature and low-pressure gas-phase refrigerant is compressed into high-temperature and high-pressure gas-phase refrigerant by the compressor, the compressed high-temperature and high-pressure gas-phase refrigerant is cooled and condensed into high-temperature liquid-phase refrigerant while passing through the condenser, and the high-pressure liquid-phase refrigerant is reduced in temperature and pressure while passing through the expansion valve, and subsequently draws heat from the surroundings so as to cool the surrounding air while changing into low-temperature and low-pressure gas-phase refrigerant in the evaporator.

Efforts to improve the efficiency of operation of the refrigeration cycle of the refrigerator in order to reduce power consumption are being continuously conducted.

DISCLOSURE OF INVENTION

Technical Problem

Therefore, the present invention has been made in view of the above problems, and it is an object of the present invention to provide a refrigerator having improved operation efficiency.

Solution to Problem

In accordance with one aspect of the present invention, the above and other objects can be accomplished by the provision of a refrigerator including a first compressor configured to compress refrigerant, a first condenser configured to condense the refrigerant compressed in the first compressor, a first expansion valve configured to reduce a temperature and pressure of the refrigerant condensed in the first condenser, a first evaporator configured to evaporate the refrigerant having passed through the first expansion valve, a second compressor configured to compress refrigerant, a second condenser configured to condense the refrigerant compressed in the second compressor, a second expansion valve configured to reduce a temperature and pressure of the refrigerant condensed in the second condenser, and a second evaporator configured to evaporate the refrigerant having passed through the second expansion valve, wherein the refrigerator further comprises a heat exchanger located at a rear of the first expansion valve, and wherein the heat exchanger and the second condenser undergo heat exchange therebetween.

The heat exchanger may absorb heat.

The heat exchanger may perform evaporation of the refrigerant.

The refrigerant having passed through the heat exchanger may be guided to the first evaporator, thereby being evaporated.

The refrigerant compressed by the first compressor may be different from the refrigerant compressed by the second compressor.

The first compressor may be driven when the second compressor is driven.

The first compressor may be driven in a state in which the second compressor is not driven.

The first evaporator may be a refrigerating compartment evaporator configured to exchange heat with air inside a refrigerating compartment, and the second evaporator may be a freezing compartment evaporator configured to exchange heat with air inside a freezing compartment.

The refrigerator may further include a first fan configured to supply the air heat-exchanged with the first evaporator to the refrigerating compartment, and a second fan configured to supply the air heat-exchanged with the second evaporator to the freezing compartment.

The first fan may not be driven, and the first compressor, the second compressor, and the second fan may be driven together while cold air is supplied to the freezing compartment.

The second compressor and the second fan may not be driven and the first compressor and the first fan may be driven while cold air is supplied to the refrigerating compartment.

The first compressor, the first fan, the second compressor, and the second fan may be driven together while cold air is supplied to the refrigerating compartment and the freezing compartment.

The second compressor may compress the refrigerant to a lower temperature than the first compressor.

Advantageous Effects of Invention

According to the present invention, the efficiency of operation of a refrigerator may be improved, which may reduce the power to be consumed for the operation of a refrigeration cycle.

Specifically, according to the present invention, in relation to a freezing compartment, dryness may be increased via the double-stage expansion of the refrigeration cycle, which may enhance freezing capability.

In addition, the compression ratio of the refrigeration cycle in the freezing compartment may be reduced, which may improve system efficiency.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a front view illustrating the open state of doors provided in a refrigerator in accordance with an embodiment of the present invention;

FIG. 2 is a view illustrating the configuration of major components in accordance with one embodiment of the present invention;

FIG. 3 is an explanatory block diagram of FIG. 2; and

FIG. 4 is a P-h diagram of FIG. 2.

BEST MODE FOR CARRYING OUT THE INVENTION

Hereinafter, exemplary embodiments of the present invention will be described in detail with reference to the accompanying drawings in order to concretely realize the objects as set forth above.

In the drawings, the sizes or shapes of components may be exaggerated to emphasize more clearly the explanation in the drawings and for convenience. In addition, the terms, which are specially defined in consideration of the configuration and operations of the present invention, may be replaced by other terms based on intensions of users and operators or customs. The meanings of these terms should be construed based on the whole content of this specification.

FIG. 1 is a front view illustrating the open state of doors provided in a refrigerator in accordance with an embodiment of the present invention.

The refrigerator in accordance with the embodiment may be equally applied to a top mount type refrigerator in which a storage compartment to store food therein is divided into an upper freezing compartment and a lower refrigerating compartment, and a side by side type refrigerator in which a freezing compartment and a refrigerating compartment are arranged on the left and right sides.

The present embodiment, for convenience of description, will be described below based on a bottom freezer type refrigerator in which a storage compartment is divided into an upper refrigerating compartment and a lower freezing compartment located below the refrigerating compartment.

A cabinet of the refrigerator is comprised of an outer case 10, which defines the overall external appearance of the refrigerator when viewed by a user from the outside, and an inner case 12, which internally defines a storage compartment 22 in which food is stored. A prescribed space may be defined between the outer case 10 and the inner case 12 and may serve as, for example, a passage for the circulation of cold air. Meanwhile, an insulation material may be interposed between the outer case 10 and the inner case 12 to allow the inside of the storage compartment 22 to be kept at a lower temperature than the outside.

In addition, a refrigerant cycle device is installed in a machine room (not illustrated), which is defined in the space between the outer case 10 and the inner case 12. The refrigerant cycle device serves to generate cold air by circulating refrigerant. Food stored in the refrigerator may be kept fresh as the inside of the refrigerator is kept at a low temperature through the use of the refrigerant cycle device. The refrigerant cycle device includes, for example, a compressor to compress refrigerant, and an evaporator (not illustrated), which changes liquid-phase refrigerant into gas-phase refrigerant so as to cause heat exchange between the refrigerant and the outside.

The refrigerator includes doors 20 and 30, which open or close the storage compartment 22. At this time, the doors may include a freezing compartment door 30 and a refrigerating compartment door 20, and each door may be pivotably installed to the cabinet of the refrigerator via hinges. A plurality of freezing compartment doors 30 and a plurality of refrigerating compartment doors 20 may be provided. That is, as exemplarily illustrated in FIG. 1, the refrigerating compartment doors 20 and the freezing compartment doors 30 may be installed so as to be pivotably opened forward about opposite edges of the refrigerator.

The space between the outer case 10 and the inner case 12 may be filled with a foam material, in order to realize thermal insulation between the outside and the storage compartment 22.

The storage compartment 22 defines a space that is thermally insulated from the outside by the inner case 12 and the door 20. When the door 20 closes the storage compartment 22, the storage compartment 22 may define a space that is isolated and thermally insulated from the outside. In other words, the storage compartment 22 may be a space that is isolated from the outside by a thermal insulation wall provided by the door 20 and a thermal insulation wall provided by the cases 10 and 12.

Within the storage compartment 22, cold air supplied from the machine room may flow everywhere so as to keep the food stored in the storage compartment 22 at a low temperature.

A shelf 40, on which food is placed, may be provided in the storage compartment 22. Here, a plurality of shelves 40 may be provided, and food may be placed on the respective shelves 40. The shelves 40 may horizontally divide the storage compartment 22.

A drawer 50 is installed in the storage compartment 22 so as to be pulled outward or pushed into the storage compartment 22. The drawer 50 is configured to accommodate and store, for example, food therein. Two drawers 50 may be respectively arranged on the left and right sides within the storage compartment 22. When attempting to access the left drawer, a user may open the door on the left side of the storage compartment 22. On the other hand, when attempting to access the right drawer, the user may open the door on the right side of the storage compartment 22.

The inside of the storage compartment 22 may be divided into a plurality of food storage spaces including, for example, the space above the shelf 40 and the space inside the drawer 50.

Although cold air supplied to one storage compartment is not permitted to freely move to another storage compartment, the cold air supplied to one storage compartment may freely move to respective spaces defined within that storage compartment. That is, cold air present above the shelf 40 may move to the space defined inside the drawer 50.

FIG. 2 is a view illustrating the configuration of major components in accordance with one embodiment of the present invention, FIG. 3 is an explanatory block diagram of FIG. 2, and FIG. 4 is a P-h diagram of FIG. 2.

Referring to FIGS. 2 to 4, the refrigerator in accordance with one embodiment includes a first compressor 100 to compress refrigerant, a first condenser 110 to condense the refrigerant compressed in the first compressor 100, a first expansion valve 120 to reduce the temperature and pressure of the refrigerant condensed in the first condenser 110, and a first evaporator 140 to evaporate the refrigerant having passed through the first expansion valve 120.

In addition, in the embodiment, the refrigerator further includes a second compressor 200 to compress refrigerant, a second condenser 210 to condense the refrigerant compressed in the second compressor 200, a second expansion valve 220 to reduce the temperature and pressure of the refrigerant condensed in the second condenser 210, and a second evaporator 250 to evaporate the refrigerant having passed through the second expansion valve 220.

Here, the refrigerator includes a heat exchanger 130 located at the rear of the first expansion valve 120, and the heat exchanger undergoes heat exchange with the second condenser 210. The heat exchanger 130 may be located closer to the second condenser 210, thereby absorbing heat from the second condenser 210.

Meanwhile, the heat exchanger 130 may function to evaporate the refrigerant. The refrigerant having passed through the heat exchanger 130 may be guided to and evaporated in the first evaporator 140.

In this case, the refrigerant that is compressed by the first compressor 100 may be different from the refrigerant that is compressed by the second compressor 200. That is, the refrigerant compressed by the first compressor 100 does not pass through the second compressor 200. In other words, the part of the cycle in which the refrigerant is compressed by first compressor 100 and the part of the cycle in which the refrigerant is compressed by the second compressor 200 may be distinguished from each other.

In addition, the first evaporator 140 may be a refrigerating compartment evaporator that exchanges heat with air inside the refrigerating compartment, and the second evaporator 230 may be a freezing compartment evaporator that exchanges heat with air inside the freezing compartment. That is, in the embodiment, the temperature of cold air provided from the first evaporator 140 may be different from the temperature of cold air provided from the second evaporator 230.

In addition, the refrigerator may include a first fan 145, which supplies the heat-exchanged air from the first evaporator 140 to the refrigerating compartment, and a second fan 235, which supplies the heat-exchanged air from the second evaporator 230 to the freezing compartment. When the first fan 145 is driven, the refrigerating compartment may be cooled by the air that is cooled by the first evaporator 140. On the other hand, when the second fan 235 is driven, the freezing compartment may be cooled by the air that is cooled by the second evaporator 230.

Referring to FIG. 3, a signal input from an input unit 600 may be transmitted to a controller 500.

The input unit 600 may be a part that receivers user input. Of course, the input unit 600 may be a constituent element that receives a value measured by a temperature sensor or a humidity sensor inside a storage compartment such as the freezing compartment or the refrigerating compartment. In addition, the input unit 600 may mean an operation cycle of the refrigerator, which is preset by a user.

The controller 500 may control the first compressor 100, the first fan 145, the second compressor 200, and the second fan 235 in response to a signal transmitted from the input unit 600.

The controller 500 may control the first compressor 100 so that it is driven when the second compressor 200 is driven. Because the refrigerant moves to the second condenser 210 when the second compressor 200 is driven, it is necessary to drive the first compressor 100 in order to allow the refrigerant passing through the second condenser 210 to be cooled by the heat exchanger 130. That is, in the present embodiment, the overall efficiency of operation of the refrigerator may be improved thanks to the displacement of the load from the refrigeration cycle, which supplies cold air into the freezing compartment, to the refrigeration cycle, which supplies cold air into the refrigerating compartment.

The refrigeration cycle that is implemented in order to supply cold air to the refrigerating compartment generally has higher system efficiency than the refrigeration cycle that is implemented in order to supply cold air to the freezing compartment. Therefore, in order to generate the same cooling capability, it is necessary to improve the operation of efficiency through the use of the refrigeration cycle that supplies cold air to the refrigerating compartment, rather than using the refrigeration cycle that supplies cold air to the freezing compartment.

In the present embodiment, the first compressor 100 and the second compressor 200 are simultaneously driven while cold air is being supplied to the freezing compartment. However, because cold air is supplied to the freezing compartment, the first fan 145 may not be driven and only the second fan 235 may be driven. That is, while cold air is supplied to the freezing compartment, the first fan 145 may not be driven, and the first compressor 100, the second compressor 200 and the second fan 235 may be driven.

In the present embodiment, the first compressor 100 may be driven in the state in which the second compressor 200 is not driven. That is, when cold air is supplied to the refrigerating compartment, only the first compressor 100 is driven to achieve cooling capability. While cold air is supplied to the refrigerating compartment, the second compressor 200 and the second fan 235 may not be driven and the first compressor 100 and the first fan 145 may be driven.

Of course, while cold air is supplied to both the freezing compartment and the refrigerating compartment, all of the first compressor 100, the first fan 145, the second compressor 200 and the second fan 235 are driven. That is, the flow of air generated by the first fan 145 enables the movement of cold air to the refrigerating compartment, and the flow of air generated by the second fan 235 enables the movement of cold air to the freezing compartment.

Hereinafter, the flow of the refrigerant will be described with reference to FIGS. 2 and 4.

First, the refrigerant is compressed by the first compressor 100. Then, the refrigerant is moved to the first condenser 110 and is condensed by the first condenser 110.

Subsequently, after being moved to the first expansion valve 120, some of the refrigerant is evaporated in the first heat exchanger 130. At this time, the first heat exchanger 130 absorbs heat from the outside. Subsequently, the remaining refrigerant may be evaporated in the first evaporator 140. When the first fan 145 is driven, air inside the refrigerating compartment may be cooled via heat exchange with the first evaporator 140, thereby cooling the refrigerating compartment.

The refrigerant, compressed by the second compressor 200, is moved to the second condenser 210 and is condensed by the second condenser 210. At this time, because the first compressor 100 is being driven, condensation increases in section "a" in FIG. 4. The refrigerant may discharge heat in an amount corresponding to section "a" in the second condenser 210. In this way, the load to be applied to the second compressor 200 may be reduced.

The refrigerant may be evaporated in the second evaporator 230 after passing through the second expansion valve 220. At this time, as the second fan 235 is driven, air inside the freezing compartment may be cooled via heat exchange with the second evaporator 230, thereby cooling the freezing compartment.

As illustrated in FIG. 4, the second compressor 200 may compress the refrigerant based on a compression ratio, which is different from a conventional compression ratio. For example, assuming that the second compressor 200 compresses the refrigerant at the conventional compression ratio, relatively high load may be applied to the second compressor 200, which may cause deterioration in the overall efficiency of the refrigeration cycle. According to the present embodiment, the efficiency of operation of the entire system may be improved compared to the case where the second compressor is driven at the conventional compression ratio, all other conditions being the same.

In addition, as illustrated in FIG. 4, consequently, the second compressor 200 compresses the refrigerant to a lower pressure than the first compressor 100. That is, because the load applied to the second compressor 200 is transferred to the first compressor 100, the load applied to the second compressor 200 may be reduced.

The present invention is not limited to the embodiments described above, various other alterations of the embodiments are possible by those skilled in the part as can be appreciated from the accompanying claims, and these alterations fall within the scope of the present invention.

MODE FOR THE INVENTION

As described above, a related description has sufficiently been discussed in the above "Best Mode" for implementation of the present invention.

INDUSTRIAL APPLICABILITY

As described above, the present invention may be wholly or partially applied to a refrigerator.

The invention claimed is:

1. A refrigerator comprising:
a first compressor configured to compress a first refrigerant;
a first condenser configured to condense the first refrigerant compressed by the first compressor;
a first expansion valve configured to reduce a temperature and a pressure of the first refrigerant condensed by the first condenser;
a first evaporator configured to evaporate the first refrigerant having passed through the first expansion valve, the first evaporator comprising a refrigerating compartment evaporator configured to exchange heat with first air inside of a refrigerating compartment of the refrigerator;
a second compressor configured to compress a second refrigerant;
a second condenser configured to condense the second refrigerant compressed by the second compressor;
a second expansion valve configured to reduce a temperature and a pressure of the second refrigerant condensed by the second condenser;
a second evaporator configured to evaporate the second refrigerant having passed through the second expansion valve, the second evaporator comprising a freezing compartment evaporator configured to exchange heat with second air inside of a freezing compartment of the refrigerator;
a first fan configured to supply the first air having exchanged heat with the first evaporator to the refrigerating compartment;
a second fan configured to supply the second air having exchanged heat with the second evaporator to the freezing compartment; and
a heat exchanger arranged after and connected to the first expansion valve, the heat exchanger being arranged before and connected to the first evaporator,
wherein the heat exchanger and the second condenser are configured to exchange heat with each other,
wherein the first evaporator is configured to receive the first refrigerant from the heat exchanger, and
wherein the freezing compartment is configured to receive cold air based on the first compressor, the second compressor, and the second fan being driven without the first fan being driven.

2. The refrigerator according to claim 1, wherein the heat exchanger is configured to absorb heat from the second condenser.

3. The refrigerator according to claim 1, wherein the heat exchanger is configured to evaporate at least a portion of the first refrigerant.

4. The refrigerator according to claim 1, wherein the first evaporator is configured to receive the first refrigerant that has passed through the heat exchanger and been guided to the first evaporator.

5. The refrigerator according to claim 1, wherein the first refrigerant compressed by the first compressor is different from the second refrigerant compressed by the second compressor.

6. The refrigerator according to claim 1, wherein the refrigerating compartment is configured to receive cold air based on the first compressor and the first fan being driven without the second compressor and the second fan being driven.

7. The refrigerator according to claim 1, wherein the refrigerating compartment and the freezing compartment are configured to receive cold air based on the first compressor, the first fan, the second compressor, and the second fan being driven.

8. The refrigerator according to claim 1, wherein the second compressor is configured to compress the second refrigerant to a lower temperature than a temperature of the first refrigerant compressed by the first compressor.

9. The refrigerator according to claim 1, wherein the first compressor and the second compressor are configured to be driven independently.

10. The refrigerator according to claim 1, wherein the heat exchanger is configured to evaporate a first portion of the first refrigerant, and
wherein the first evaporator is configured to evaporate a second portion of the first refrigerant, the second portion of the first refrigerant being different from the first portion of the first refrigerant.

11. The refrigerator according to claim 10, wherein the second condenser is configured to reduce the temperature of the second refrigerant based on the heat exchanger evaporating the first portion of the first refrigerant.

12. The refrigerator according to claim 1, wherein the freezing compartment is configured to receive cold air based on the first compressor and the second compressor being simultaneously driven without the first fan being driven.

13. The refrigerator according to claim 1, wherein the heat exchanger is located closer to the second condenser than to the first condenser.

14. The refrigerator according to claim 1, wherein the first evaporator is disposed between the heat exchanger and the first compressor.

* * * * *